US011526657B2

United States Patent
Li et al.

(10) Patent No.: US 11,526,657 B2
(45) Date of Patent: Dec. 13, 2022

(54) METHOD AND APPARATUS FOR ERROR CORRECTION OF NUMERICAL CONTENTS IN TEXT, AND STORAGE MEDIUM

(71) Applicant: BEIJING BAIDU NETCOM SCIENCE AND TECHNOLOGY CO., LTD., Beijing (CN)

(72) Inventors: Chenhui Li, Beijing (CN); Teng Hu, Beijing (CN); Yongfeng Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/375,225

(22) Filed: Jul. 14, 2021

(65) Prior Publication Data
US 2021/0342524 A1    Nov. 4, 2021

(30) Foreign Application Priority Data
Dec. 25, 2020    (CN) .......................... 202011561776.2

(51) Int. Cl.
*G06F 40/166*    (2020.01)
*G06F 40/194*    (2020.01)
(Continued)

(52) U.S. Cl.
CPC .......... *G06F 40/166* (2020.01); *G06F 40/103* (2020.01); *G06F 40/194* (2020.01); *G06F 40/232* (2020.01); *G06F 40/279* (2020.01)

(58) Field of Classification Search
CPC .... G06F 40/103; G06F 40/166; G06F 40/194; G06F 40/232; G06F 40/279
See application file for complete search history.

(56) References Cited

U.S. PATENT DOCUMENTS

| 11,182,354 | B1 * | 11/2021 | Patel | G06F 16/116 |
| 2014/0172774 | A1 * | 6/2014 | Liu | G06F 40/295 706/59 |
| 2014/0223310 | A1 | 8/2014 | Divay et al. | |

FOREIGN PATENT DOCUMENTS

| CN | 101950286 A | * | 1/2011 | |
| CN | 106708799 B | * | 2/2020 | G06F 40/232 |

(Continued)

OTHER PUBLICATIONS

Office Action issued in corresponding JP Application No. 2021-187369 with English translation dated Oct. 4, 2022 (10 pages).

*Primary Examiner* — Chau T Nguyen
(74) *Attorney, Agent, or Firm* — Osha Bergman Watanabe & Burton LLP

(57) ABSTRACT

This application discloses a method, an apparatus and an electronic device for error correction of numerical contents in a text, and relates to a technology field of artificial intelligence such as natural language processing and deep learning. The implementation method is: obtaining a target text to be processed; determining original numerical contents included in the target text; determining target types corresponding to the original numerical contents; and performing error correction on each original numerical content according to an error correction manner corresponding to each target type. Therefore, the error correction of numerical contents is realized according to types of the numerical contents, which is not only limited to the error correction of the numerical format, but also the logical error correction of the numerical content, so as to improve the numerical error correction capability and thereby improving the recall rate of detection and correction of wrong values.

12 Claims, 4 Drawing Sheets

(51) Int. Cl.
*G06F 40/279* (2020.01)
*G06F 40/103* (2020.01)
*G06F 40/232* (2020.01)

(56) References Cited

FOREIGN PATENT DOCUMENTS

| | | | |
|---|---|---|---|
| JP | H11167576 | A | 6/1999 |
| JP | H11250037 | A | 9/1999 |
| JP | 2000348259 | A | 12/2000 |
| JP | 3628160 | B2 * | 3/2005 |
| JP | 2008020521 | A | 1/2008 |
| JP | 2008112363 | A | 5/2008 |
| JP | 2020197592 | A * | 12/2020 |

* cited by examiner

METHOD AND APPARATUS FOR ERROR CORRECTION OF NUMERICAL CONTENTS IN TEXT, AND STORAGE MEDIUM

CROSS-REFERENCE TO RELATED APPLICATION

The present application is based upon and claims priority to Chinese Patent Application No. 202011561776.2, filed on Dec. 25, 2020, the entirety contents of which are incorporated herein by reference.

TECHNICAL FIELD

The present disclosure relates to a field of computer technology, specifically involving fields of artificial intelligence technologies such as natural language processing and deep learning, and particularly to a method and an apparatus for error correction of numerical contents in a text and a storage medium.

BACKGROUND

When users are writing documents, usually due to negligence or lack of knowledge of writing standard, numerical input errors or irregular usage will happen, such as writing legitimacy errors, numerical content (logical) errors, and the like. The error correction for numerical contents involving reasoning calculation is the key to current research.

SUMMARY

The present disclosure provides a method, an apparatus and an electronic device for error correction of numerical contents in a text of numerical type.

According to embodiments of the present disclosure, there is provided a method for error correction of numerical contents in a text. The method includes: obtaining a target text to be processed; determining original numerical contents included in the target text; determining target types corresponding to the original numerical contents; and performing error correction on each original numerical content according to an error correction manner corresponding to each target type.

According to embodiments of the present disclosure, there is provided an apparatus for error correction of numerical contents in a text. The apparatus includes: one or more processors; a memory storing instructions executable by the one or more processors; in which the one or more processors are configured to: obtain a target text to be processed; determine original numerical contents included in the target text; determine target types corresponding to the original numerical contents; and perform error correction on each original numerical content according to an error correction manner corresponding to each target type.

According to embodiments of the present disclosure, there is provided a non-transitory computer-readable storage medium having computer instructions stored thereon, in which the computer instructions are configured to cause a method for error correction of numerical contents in a text. The method includes: obtaining a target text to be processed; determining original numerical contents included in the target text; determining target types corresponding to the original numerical contents; and performing error correction on each original numerical content according to an error correction manner corresponding to each target type.

It is to be understood that the content in this part is not intended to identify key or important features of the embodiments of the present disclosure, and does not limit the scope of the present disclosure. Other features of the present disclosure will be easily understood through the following specification.

BRIEF DESCRIPTION OF THE DRAWINGS

The drawings are used to better understand the solution, and are not restrictive of the disclosure, as claimed.

DETAILED DESCRIPTION

Figure 1:
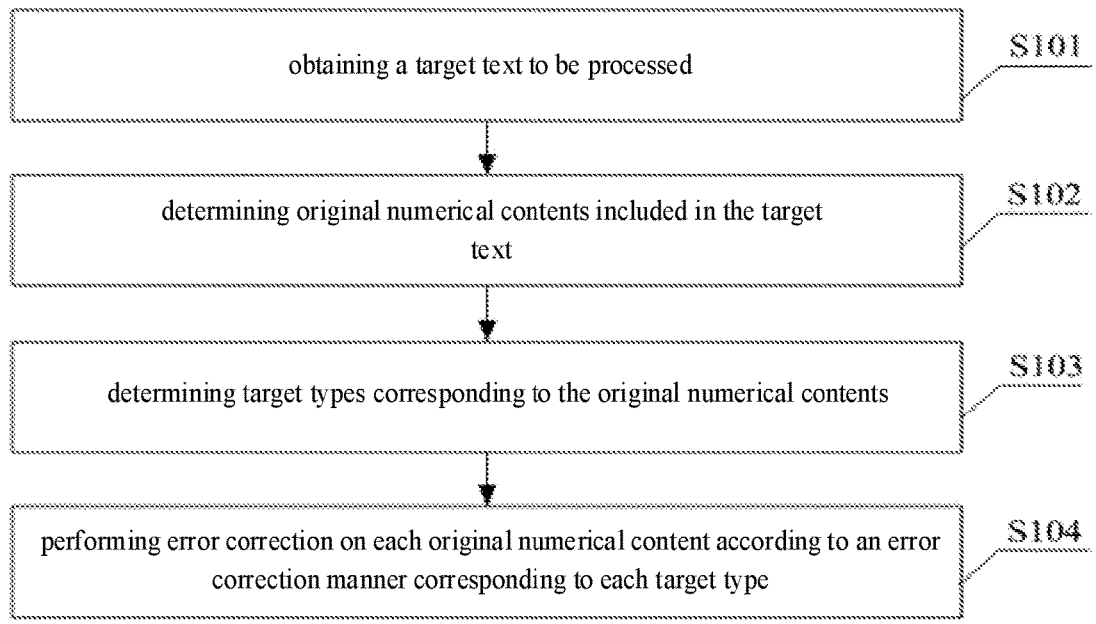
FIG. 1 is a flow chart illustrating a method for error correction of numerical contents in a text provided by embodiments of the present disclosure.

The following describes exemplary embodiments of the present disclosure with reference to the attached drawings, which include various details of the embodiments of the present disclosure to facilitate understanding, and they should be considered as merely exemplary. Therefore, those skilled in the art should realize that various changes and modifications can be made to the embodiments described herein without departing from the scope and spirit of the present disclosure. Similarly, for clarity and conciseness, descriptions of well-known functions and structures are omitted in the following description.

AI (Artificial Intelligence) is a discipline that studies to make computers to simulate certain human thinking processes and intelligent behaviors (such as learning, reasoning, thinking, planning, and the like) with both hardware-level technologies and software-level technologies. Artificial intelligence hardware technologies generally include technologies such as sensors, dedicated artificial intelligence chips, cloud computing, distributed storage, and big data processing technology; artificial intelligence software technologies mainly include technologies in several directions, such as computer vision technology, speech recognition technology, natural language processing technology and machine learning/deep learning, big data processing technology, and knowledge graph technology.

Deep learning is a new research direction in the field of machine learning, and it is introduced into machine learning to bring it closer to the original goal-artificial intelligence. With the development of artificial intelligence technology, the use of NLP (Natural Language Processing) technology, and deep learning technology for error correction in text is more and more widely used. NLP is an important direction in the fields of computer science and artificial intelligence, which studies various theories and methods that can realize effective communication between man and computers in natural language. Deep learning is the inherent law and presentation level of learning sample data, and the information obtained during this learning process is of great help to the interpretation of data such as texts, images, and sounds, with the ultimate goal of enabling machines to have analytical and learning abilities like human, and to recognize data such as texts, images, and sounds.

It is noted that, when users are writing documents, usually due to negligence or lack of knowledge of writing standard, numerical input errors or irregular usage will happen. Users' main writing errors are: date legitimacy errors (non-existent date, date deadline error), numerical errors (incorrect amount format, case sensitive mismatch). In addition, due to the Chinese numerical specification, in the using process, the user may improperly use numerical range, and improper conjunction of Arabic numerals and Chinese numerals and other errors. Therefore, a method for error correction of values in text is needed to improve the accuracy of values and improve the user experience.

The technologies for error correction of values in the related art are limited to irregular correcting format, and for more important numerical contents, whether rule-based or language model-based method lack error correction capability due to reasoning calculation. Therefore, for current research, it is the key to perform error correction for numerical contents involving reasoning calculation.

For this reason, the embodiments of the present disclosure provide a method, an apparatus and an electronic device for error correction of numerical contents in a text. According to the embodiments of the present disclosure, the error correction of numerical contents is realized according to types of numerical contents, which is not only limited to the error correction of the value format, but also the error correction capability of the value, so as to improve the recall rate of detection and correction of wrong values, and improve the user experience.

The following is a reference to the attached drawings illustrating a method, an apparatus and an electronic device for error correction of numerical contents in a text in the embodiments of the present disclosure.

FIG. 1 is a flow chart illustrating a method for error correction of numerical contents in a text provided by embodiments of the present disclosure.

It is to be noted that the executive body of the method for error correction of numerical contents in a text of the embodiments of the present disclosure can be an electronic device, specifically, the electronic device can be, but not limited to, a computer, a mobile terminal, which can be but not limited to a personal computer, a smartphone, an IPAD and the like.

As illustrated in FIG. 1, the method for error correction of numerical contents in a text includes the following blocks.

In block S101, a target text to be processed is obtained.

In the embodiments of the present disclosure, the text where the numerical contents to be corrected is located is called the target text to be processed, in which the target text can be a paragraph, or a passage. The length and type of the target text are not limited.

In block S102, original numerical contents included in the target text are determined.

Specifically, after obtaining the target text to be processed, in order to facilitate error correction of numerical contents, one or more original numerical contents included in the target text are extracted.

For example, the target text is "All senior three students will participate in training organized by school for a period of three months from Mar. 1, 2020 to May 31, 2020, with corresponding examination organized after the training is completed", and the original numerical content is "for a period of three months from Mar. 1, 2020 to May 31, 2020". The original numerical content is extracted for subsequent error correction.

In block S103, target types corresponding to the original numerical contents are determined.

Specifically, after each original numerical content is determined, the corresponding target type can be determined according to the feature of each original numerical content, in which the feature can be the unit of the value (for example, "seconds", "meter", and the like), or can be a specific symbol (for example, "Y", "%", and the like). The type of the value can be divided into amount type value, date type value, time type value, length type value, and the like, or it can be divided into absolute value (not relevant to the context), associated value (value relevant to the context, such as counting type value), in which the context includes words and numerical contents.

As mentioned above, the target types are determined according to the features of each original numerical content. In addition, in the embodiments of the present disclosure, a deep learning model can be trained in advance, that is, an original numerical content-target type model, and the obtained original numerical contents can be input into the model to output corresponding target types.

For example, when the original numerical content is "30 seconds", the corresponding target type is a time type value; when the original numerical content is "59 yuan", the corresponding target type is an amount type value.

In block S104, error correction is performed on each original numerical content according to an error correction manner corresponding to each target type.

Specifically, the numerical contents of different target types can correspond to different methods for error correction, and each target type corresponds to one method for error correction. Therefore, after obtaining the target types corresponding to each original numerical content, the corresponding method for error correction of each target type can be obtained. The method for error correction is used to correct the corresponding original numerical contents. For example, the numerical content "30 seconds" is corrected by the method for error correction of time type values.

There may be only one original numerical content in the target text, or there may be two or more original numerical contents.

When there is only one value or a plurality of absolute values in the target text, the writing legitimacy of the numerical content can be checked and corrected based on the legal writing format corresponding to the target type to which the numerical content belongs. For example, when the original numerical content is "0219 (year)", the corresponding target type is date, and when the numerical content is corrected according to the legal writing format corresponding to the date, the corrected numerical content is "2019 (year)".

When there are two or a plurality of original numerical contents in the target text, and there is a correlation between original numerical contents, not only the writing legitimacy is checked and corrected, but also the correctness of the numerical contents can be checked and corrected based on the association relationship. For example, when the original numerical content is "for a period of 3 months from Mar. 1, 2020 to Jun. 1, 2020", the corresponding target type is date. The original numerical content is corrected according to the legal writing format based on date and the relationship among the three values, and the corrected numerical content is "for a period of 3 months from Mar. 1, 2020 to May 31, 2020".

The method for error correction of numerical contents in a text of the embodiments of the present disclosure determines an error correction manner corresponding to the original numerical content according to the target type corresponding to the original numerical content, so as to correct the corresponding numerical content according to the method for error correction, thereby realizing the error correction of the numerical content, which is not only limited to the error correction of numerical format, but also the logical error correction of the numerical content. It also improves the numerical error correction capability, thereby improving the recall rate of the detection and correction of the wrong value.

In order to ensure the reliability when determining the target type, in an embodiment of the present disclosure, when determining the target type corresponding to each original value content, the target text can be traversed based on a specified or preset keyword to determine the original numerical contents included in the target text that match the specified keyword; and/or, the target text can be traversed based on a specified or preset template to determine the original numerical contents included in the target text that match the specified template.

The template may include a numerical content template and a regular template, and the template and the keyword can be flexibly made by the user to adapt to the original numerical contents in different application scenarios.

Specifically, after obtaining the target text to be processed, the target text can be traversed. When the target text includes the specified keyword and/or the target text that satisfy the specified template, the text fragment where the keyword or the template is located are extracted, which is called the original numerical content.

It is to be noted that the extraction of original numerical contents in a target text in the embodiments of the present disclosure can be in any method, as long as the numerical contents can be extracted, but the method may include but not limited to extract numerical contents based on keywords, numerical content templates, or regular templates.

As a result, the original numerical contents included in the target text are determined based on the specified keyword and/or template, and the keyword or template can be specified by the user, enabling the user to fully combine application scenarios for flexible configuration and ensuring reliability to better meet the needs of different businesses.

In the above error correction of original numerical contents, when two or more original numerical contents are extracted, there may be correlations between each of the original numerical contents. For example, one of the original values is calculated by addition, subtraction, multiplication, and division of other original values. In this case, not only the writing legitimacy of each original numerical content is corrected, but also the content of the value itself is corrected. For example, firstly, the result of other original values obtained by addition, subtraction, multiplication, and division is calculated, and whether one of the original values matches the result is determined, if yes, the original value will be corrected. Alternatively, the original numerical content may be relevant to the contextual content, that is, the original numerical value is inferred from the context of the text. In this case, not only the writing legitimacy of each original numerical content is corrected, but also the contextual content is analyzed according to natural language processing technology to obtain the result of the analysis, and errors are corrected when the original value is inconsistent with the result.

It is to be noted that when two or a plurality of original numerical contents need to be corrected, the data format in each numerical content may be different. In this case, in order to facilitate the checking of the wrong value to improve the recall rate of the correction of the numerical contents, each original numerical content can be normalized.

That is, in an embodiment of the present disclosure, the target text includes N original numerical contents, in which N is an integer greater than 1. After the above block S103, it may also include: performing normalization on M original numerical contents according to data formats associated with the target types corresponding to the M original numerical contents in case that the target types corresponding to the M original numerical contents are the same, in which M is a positive integer less than or equal to N.

For example, when the target types corresponding to the M original numerical contents are all date type, the M original numerical contents can be normalized to formats such as "xx (month) xx (day), xxxx (year)", "xx (month) xxxx (year)" or "xx (month) xx (day)", and the original forms of "x (year)", "x (month)" and "x (day)" representing the time interval are retained. Then, error correction is performed on each original numerical content according to an error correction manner corresponding to the date type.

As a result, the M original numerical contents are normalized and then corrected, which improves the standardization, thereby fully improving the recall rate of numerical error correction.

When there are only associated values in the target text, the contextual content is needed to be analyzed or other values is needed to be reasoned and calculated so as to correct the associated values. For example, when the original numerical contents include the counting type value, it is necessary to correct the ending counting point based on the counting type value and the initial counting point.

Figure 2:
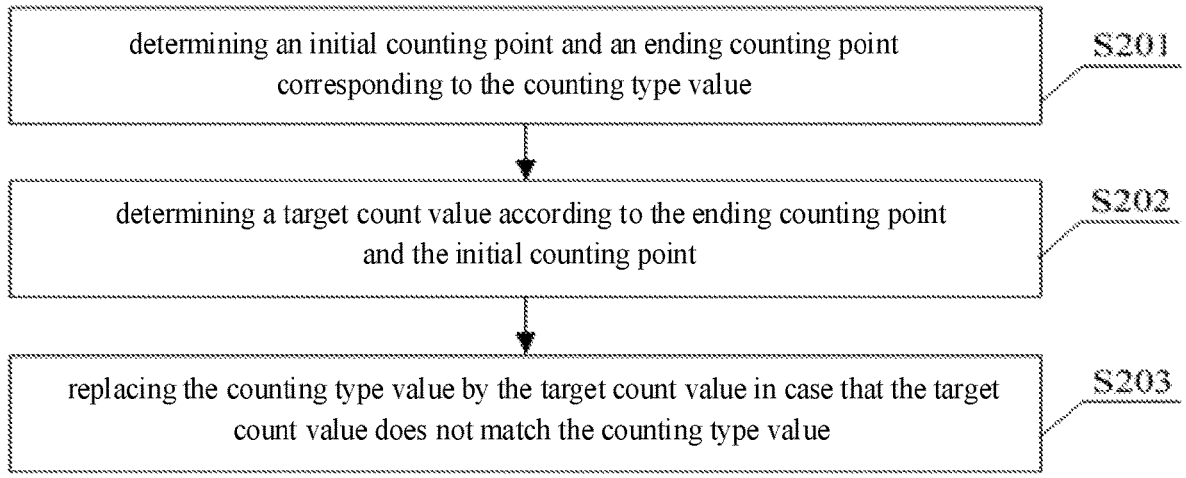
FIG. 2 is a flow chart illustrating a process for error correction of a counting type value provided by embodiments of the present disclosure.

That is, as illustrated in FIG. 2, in an embodiment of the present disclosure, the target text includes a counting type value. At this time, the above block S104 may include the following blocks.

In block S201, an initial counting point and an ending counting point corresponding to the counting type value are determined.

The target text may clearly record the initial counting point and the ending counting point, if the target text does not clearly record the initial counting point and the ending counting point, the initial counting point and the ending counting point can be determined based on contextual reasoning.

In block S202, a target count value is determined according to the ending counting point and the initial counting point.

For example, the difference between the ending counting point and the initial counting point is the target count value.

In block S203, the counting type value is replaced by the target count value in case that the target count value does not match the counting type value.

Specifically, after the target count value is obtained, it is determined whether the target count value matches the counting type value, if no, the counting type value is replaced by the target count value, so as to realize the error correction of the counting type value. The replacement can be performed directly, or with a revision mark, or with other replacement methods, and the numerical content after the replacement is marked.

For example, the original numerical content is "there are 3 seats in total from seat number 5 to 8", in which the counting type value is 3, the ending counting point is 6, and the initial counting point is 5. According to the ending counting point and the initial counting point, it is determined that the target count value is 4, which does not match the count value 3. Therefore, the counting type value 3 is replaced by the target count value 4, and the corrected numerical content "there are 3 seats in total from seat number 5 to 8" is obtained.

As mentioned above, when the target text includes a counting type value, error correction is performed on the counting type value. In addition, when the initial counting point or the ending counting point is clearly recorded in the text, the initial counting point or the ending counting point can also be corrected.

For example, when the original numerical content is "for a period of 3 months from Mar. 1, 2020 to Jun. 1, 2020". At this time, the time interval from Mar. 1, 2020 to Jun. 1, 2020 can be calculated, which is not 3 months, so the date that is 3 months later from Mar. 1, 2020 is calculated as May 31, 2020, and Jun. 1, 2020 is corrected to May 31, 2020, that is, the corrected numerical content is "for a period of 3 months from Mar. 1, 2020 to May 31, 2020". It is to be noted that only symbols "~" or "—" can be used as connectors between two values that indicate a range of values. When correcting a value range, the symbol between the two values that indicate a range is checked. In the case of non-compliance, corrections are made.

Figure 3:
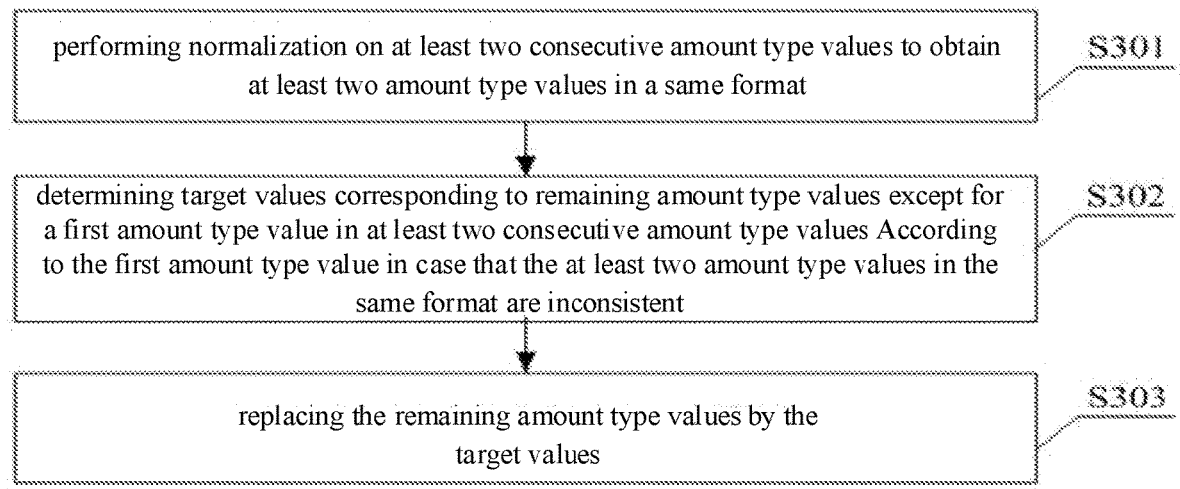
FIG. 3 is a flow chart illustrating a process for error correction of an amount type value provided by embodiments of the present disclosure.

As illustrated in FIG. 3, in an embodiment of the present disclosure, the target text includes at least two consecutive amount type values. At this time, the above block S104 may include the following blocks.

In block S301, normalization is performed on at least two consecutive amount type values to obtain at least two amount type values in a same format.

In this embodiment, the format of the amount type value can be uniformly converted into an Arabic numerical format or a Chinese numerical format. The conversion method can be, but not limited to: format conversion from Chinese numerical value to Arabic numerical value; format conversion from Arabic numerical value to Chinese numerical value; conversion from mixed Arabic numerical value and Chinese numerical value to Arabic numerical value; conversion from mixed Arabic numerical value and Chinese numerical value to Chinese numerical value; and standardization of mixed Arabic numerical value and Chinese numerical value (standardized according to the use of national standard digitals).

In block S302, target values corresponding to remaining amount type values except for a first amount type value in the at least two consecutive amount type values are determined according to the first amount type value in case that the at least two amount type values in the same format are inconsistent.

Specifically, it can be judged whether at least two consecutive amounts normalized to a Chinese numerical format or an Arabic numerical format are consistent. When they are inconsistent, the target value corresponding to the remaining amount type value is determined according to the first amount type value.

In block S303, the remaining amount type values are replaced by the target values.

Specifically, replacement can be performed directly, or with a revision mark, or with other replacement methods, and the numerical content after replacement can be marked.

For example, when the original numerical content is "The total amount of the project is ¥43,6382 (RMB Four Hundred and Thirty-Eight Thousand Six Hundred and Thirty-Two)", the Chinese numerical value is normalized to the Arabic numerical value and then it becomes "The total amount of the project is ¥43,6382 (¥43,6382)". The two Arabic numerical values are inconsistent after comparison. Therefore, according to the first value of ¥43,6382, the latter value is determined to be ¥43,6382. After the correction, the Arabic numerical value is converted to a Chinese numerical value, and the numerical content is corrected to "The total amount of the project is ¥43,6382 (RMB Four Hundred and Thirty-Six Thousand Three Hundred and Eighty-Two)".

As a result, the error correction of the counting type value and the amount type value can be realized through reasoning calculation, and the recall rate of the error correction can be improved.

Figure 4:
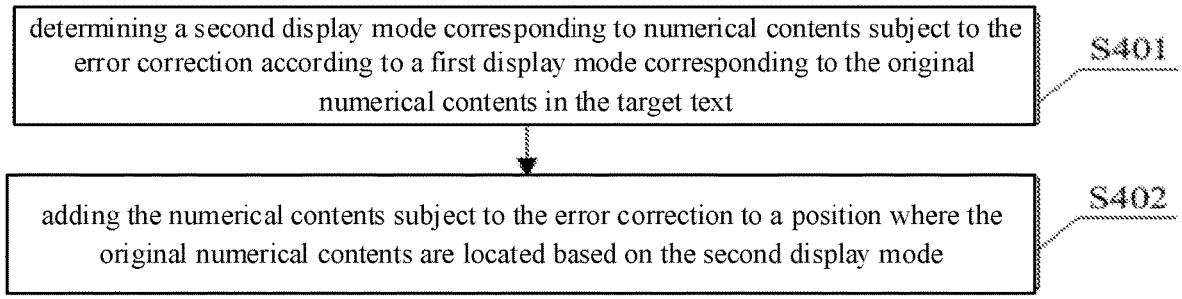
FIG. 4 is a flow chart illustrating a display for corrected numerical contents provided by embodiments of the present disclosure.

When the original numerical content is corrected, the user can be prompted to make modifications through voice prompts and text prompts. Furthermore, the corrected numerical content can be directly displayed at the corresponding position to improve the user experience. In an embodiment of the present disclosure, as illustrated in FIG. 4, performing error correction on each original numerical content in block S104 may include the following blocks.

In block S401, a second display mode corresponding to numerical contents subjected to the error correction is determined according to a first display mode corresponding to the original numerical contents in the target text.

The first display mode is a display mode of the original numerical contents, and the second display mode is different from the first display mode.

In block S402, the numerical contents subjected to the error correction are added to a position where the original numerical contents are located based on the second display mode.

That is to say, the corrected numerical content is added to the location in a different display mode from the original numerical contents. In this way, the original numerical contents and the corrected numerical content can be displayed differently, which is convenient for users to view.

For example, the corrected numerical content is highlighted, or added to the target text in a special font, or in a revision mode.

As a result, not only the error correction of the original numerical contents is realized, but also the corrected numerical content is appropriately added to the target text in a different display mode, which improves the user experience.

As described above, error correction is performed on the original numerical contents in the target text written by the user. In actual applications, the user may not correct some of the original numerical contents. At this time, according to the user's instruction, the numerical contents including a specified fragment can be not corrected according to the user's needs, and the error correction process can be directly exited or the error correction of the next numerical content can be performed.

Figure 5:
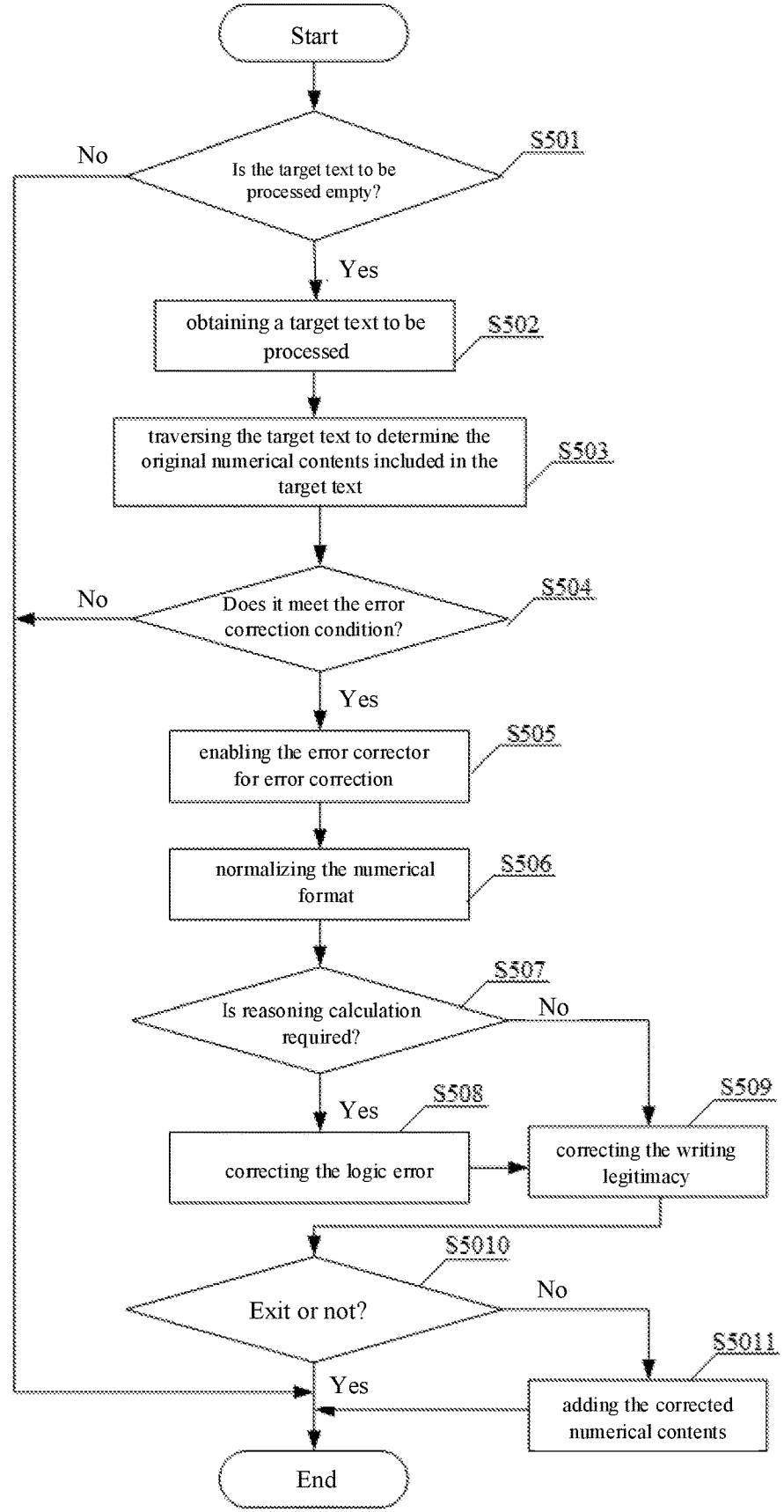
FIG. 5 is a flow chart illustrating another method for error correction of numerical contents in a text provided by embodiments of the present disclosure.

Based on the above description, in an embodiment of the present disclosure, as illustrated in FIG. 5, the method for error correction of numerical contents in a text includes the following blocks.

In block S501, it is determined whether the target text to be processed is not empty, if the target text to be processed is not empty, the block S502 is executed; if it is empty, the process ends.

In block S502, a target text to be processed is obtained.

In block S503, the target text is traversed based on a specified keyword and/or template to determine the original numerical contents included in the target text.

In block S504, it is determined whether the original numerical contents meet the error correction condition, if yes the block S505 is executed; if no, the process ends.

The value that meets the error correction condition can be input to the error corrector for error correction. When there is no value type that meets the input requirement of the error corrector, the process ends.

In block S505, the error corrector is enabled for error correction.

In block S506, normalization is performed on the numerical format.

In block S507, it is determined whether a reasoning calculation is required, if yes, the block S508 is executed; if no, the block S509 is executed.

In block S508, the logic error is corrected.

In block S509, the writing legitimacy is corrected.

In block S5010, it is determined whether the exit condition is met, if yes, the block S5012 is executed; if no, the block S5011 is executed.

When there is no need to display the corrected numerical contents, the exit condition is met.

In block S5011, the numerical contents subjected to the error correction are added.

According to the method for error correction of numerical contents in a text of the embodiments of the present disclosure, an error correction manner corresponding to the original numerical contents is determined according to the target types corresponding to the original numerical contents, so as to correct the corresponding numerical contents according to the method for error correction, thereby realizing the error correction of the numerical contents. Therefore, it is not only limited to the error correction of the numerical format, but also the logical error correction of the numerical contents, so as to improve the numerical error correction capability and thereby improving the recall rate of detection and correction of wrong values, and the extraction and the rule of inference of the original numerical contents are all configurable, with good configurability, which enables users to fully combine application scenarios for flexible configuration and to better meet the needs of different businesses.

Figure 6:
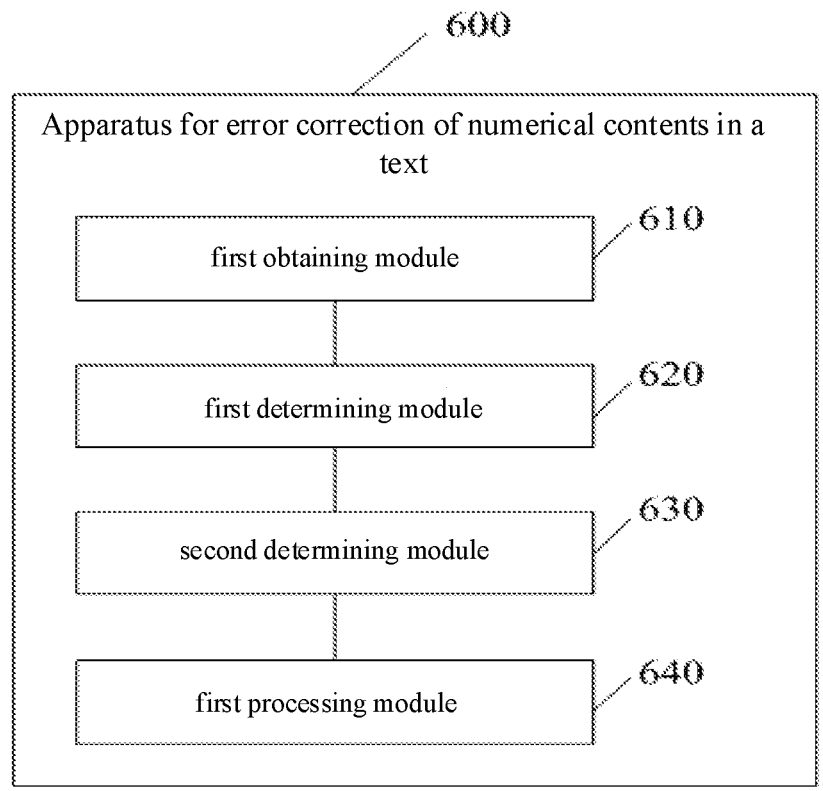
FIG. 6 is a schematic diagram illustrating an apparatus for error correction of numerical contents in a text provided by embodiments of the present disclosure.

There is also provided an apparatus for error correction of numerical contents in a text in an embodiment of the present disclosure. FIG. 6 is a schematic diagram illustrating an apparatus for error correction of numerical contents in a text provided by embodiments of the present disclosure.

As illustrated in FIG. 6, the apparatus 600 for error correction of numerical contents in a text may include a first obtaining module 610, a first determining module 620, a second determining module 630 and a first processing module 640. The first obtaining module 610 is configured to obtain a target text to be processed; the first determining module 620 is configured to determine original numerical contents included in the target text; the second determining module 630 is configured to determine target types corresponding to the original numerical contents; and the first processing module 640 is configured to perform error correction on each original numerical content according to an error correction manner corresponding to each target type.

In an embodiment of the present disclosure, the first determining module 620 is specifically configured to: traverse the target text based on a specified keyword and/or template to determine the original numerical contents included in the target text.

In an embodiment of the present disclosure, the apparatus 100 for error correction of numerical contents in a text further includes: a second processing module, configured to perform normalization on M original numerical contents according to data formats associated with the target types corresponding to the M original numerical contents in case that the target types corresponding to the M original numerical contents are the same, in which M is a positive integer less than or equal to N.

In an embodiment of the present disclosure, the first processing module 640 includes: a first determining unit, a second determining unit, and a first replacement unit. The first determining unit is configured to determine an initial counting point and an ending counting point corresponding to the counting type value. The second determining unit is configured to determine a target count value according to the ending counting point and the initial counting point. The first replacement unit is configured to replace the counting type value by the target count value in case that the target count value does not match the counting type value.

In an embodiment of the present disclosure, the first processing module 640 further includes: a first obtaining unit, a third determining unit, and a second replacement unit. The first obtaining unit is configured to perform normalization on at least two consecutive amount type values to obtain at least two amount type values in a same format. The third determining unit is configured to determine target values corresponding to remaining amount type values except for a first amount type value in the at least two consecutive amount type values according to the first amount type value in case that the at least two amount type values in the same format are inconsistent. The second replacement unit is configured to use replace the remaining amount type values by the target values.

In an embodiment of the present disclosure, the first processing unit 640 further includes: a fourth determining unit, and a first display unit. The fourth determining unit is configured to determine a second display mode corresponding to numerical contents subjected to the error correction according to a first display mode corresponding to the original numerical contents in the target text. The first display unit is configured to add the numerical contents subjected to the error correction to a position where the original numerical contents are located based on the second display mode.

It is to be noted that other specific modes of execution of the apparatus for error correction of numerical contents in a text of the embodiments of the present disclosure can refer to the specific mode of execution of the method for error correction of numerical contents in the foregoing text, and it will not be elaborated here to avoid redundancy.

The apparatus for error correction of numerical contents in a text of the embodiments of the present disclosure realizes the error correction of the numerical contents according to the types of the numerical contents, not only the format error correction of the numerical values, but also the logical error correction of the numerical contents, which improves the numerical error correction ability, thereby increasing the recall rate of detection and correction of error values.

According to the embodiments of the present disclosure, the present disclosure also provides an electronic device for error correction of numerical contents in a text, a readable-storage medium and a computer program product. The following is illustrated in combination with FIG. 7.

Figure 7:
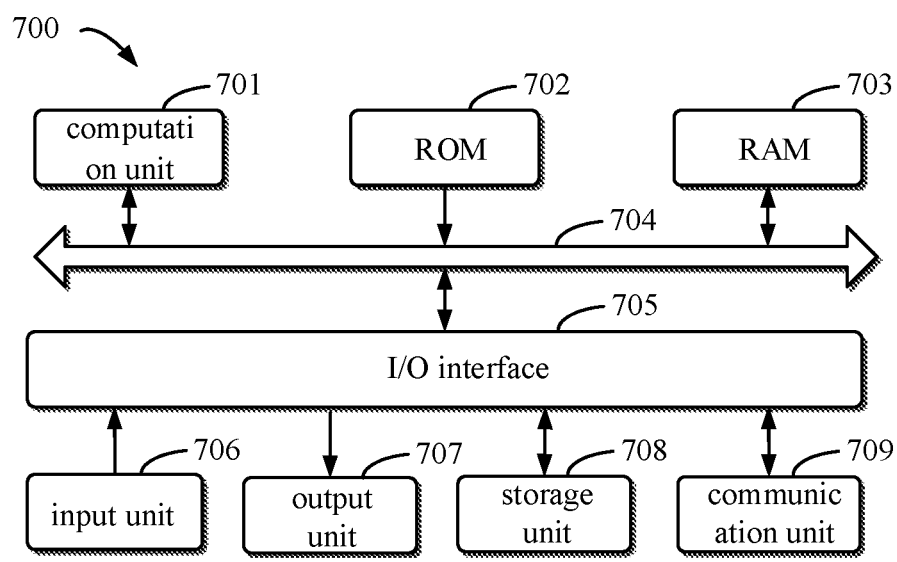
FIG. 7 is a block diagram illustrating an electronic device for realizing a method for error correction of numerical contents in a text provided by embodiments of the present disclosure.

FIG. 7 is a block diagram illustrating an electronic device of a method for error correction of numerical contents in a text according to an exemplary embodiment. Electronic devices are intended to represent various forms of digital computers, such as laptop computers, desktop computers, work tables, personal digital assistants, servers, blade servers, mainframe computers, and other suitable computers. Electronic devices can also represent various forms of mobile apparatus, such as personal digital processors, cellular phones, smart phones, wearable devices, and other similar computing apparatus. The components illustrated herein, their connections and relationships, and their functions are merely examples, and are not intended to limit the implementation of the disclosure described and/or required herein.

As illustrated in FIG. 7, the device 700 includes a calculation unit 701, which can execute various appropriate actions and processing according to the computer program stored in a read only memory (ROM) 702 or the computer program loaded in a random access memory (RAM) 703 from the storage unit 708. In the RAM 703, various programs and data required for the operation of the storage device 700 are also stored. The calculation unit 701, the ROM 112, and the RAM 703 are connected to each other through a bus 704. An input/output (I/O) interface 705 is also connected to the bus 704.

A plurality of components in the device 700 are connected to the I/O interface 705, including: an input unit 706, such as a keyboard, a mouse, and the like; an output unit 707, such as various types of displays, speakers, and the like; and a storage unit 708, such as a magnetic disk, an optical disk, and the like; and a communication unit 709, such as a network card, a modem, a wireless communication transceiver, and the like. The communication unit 709 allows the device 700 to exchange information/data with other devices through a computer network such as the Internet and/or various telecommunication networks.

The computation unit 701 may be various general-purpose and/or special-purpose processing components with processing and computing capabilities. Some examples of the computation unit 701 include but are not limited to central processing unit (CPU), graphics processing unit (GPU), various dedicated artificial intelligence (AI) computing chips, various computing units running machine learning model algorithms, digital signal processor (DSP), and any appropriate processor, controller, micro-controller, and the like. The calculation unit 701 executes each method and processing described above, such as the method for error correction of numerical contents in a text. For example, in some embodiments, the method for error correction of numerical contents in a text can be implemented as a computer software program, which is tangibly included in a machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the calculation unit 701, one or more blocks of the method for error correction of numerical contents in a text described above can be executed. Alternatively, in other embodiments, the calculation unit 701 may be configured to perform a method for error correction of numerical contents in a text by any other suitable methods (for example, by means of firmware).

Various implementations of the systems and technologies described herein can be implemented in digital electronic circuit systems, integrated circuit systems, field programmable gate arrays (FPGA), application specific integrated circuits (ASIC), application-specific standard products (ASSP), systems on chip (SOC), complex programmable logic device (CPLD), computer hardware, firmware, software, and/or their combination thereof. These various embodiments may be implemented in one or more computer programs, in which the one or more computer programs may be executed and/or interpreted on a programmable system including at least one programmable processor, in which the programmable processor may be a dedicated or general purpose programmable processor that can receive data and instructions from the storage system, at least one input apparatus, and at least one output apparatus, and transmit the data and instructions to the storage system, at least one input apparatus, and at least one output apparatus.

The program codes used to implement the method of the present disclosure can be written in any combination of one or more programming languages. These program codes can be provided to processors or controllers of general-purpose computers, special-purpose computers, or other programmable data processing apparatus, so that when the program codes are executed by a processor or a controller, functions/operations specified in flowcharts and/or block diagrams are implemented. The program codes can be entirely executed on a machine, partly executed on a machine, partly executed on a machine as an independent software package and partly executed on a remote machine or entirely executed on a remote machine or a server.

In the context of the present disclosure, a machine-readable medium may be a tangible medium, which may include or store programs for use by instruction execution systems, apparatus, or devices, or for use by the combination of instruction execution systems, apparatus, or devices. The machine-readable medium may be a machine-readable signal medium or a machine-readable storage medium. The machine-readable medium may include, but not limited to, an electronic, magnetic, optical, electromagnetic, infrared, or semiconductor system, apparatus, or device, or any suitable combination thereof. More specific examples of machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with the user, the systems and technologies described herein can be implemented on a computer and the computer includes a display apparatus for displaying information to the user (for example, a CRT (cathode ray tube) or an LCD (liquid crystal display) monitor)); and a keyboard and a pointing apparatus (for example, a mouse or a trackball) through which the user can provide input to the computer. Other types of apparatus can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser through which the user can interact with the implementation of the systems and technologies described herein), or a computing system that includes any combination of the back-end components, middleware components, or front-end components. The components of the system can be connected to each other through any form or medium of digital data communication (for example, a communication network). Examples of communication networks include: a local area network (LAN), a wide area network (WAN), the Internet, and a blockchain network.

The computer system may include a client and a server. The client and server are generally far away from each other and usually interact through a communication network. The relationship between the client and the server is generated by computer programs that run on the corresponding computer and have a client-server relationship with each other. The server can be a cloud server, also known as a cloud computing server or a cloud host, which is a host product in the cloud computing service system to solve the problem of difficult management and weak business scalability of traditional physical hosts and VPS (Virtual Private Server) services. The server can also be the server for distributed system, or the server that combine block chain.

According to the technical solution of the embodiments of the present disclosure, the error correction of numerical contents is realized according to the types of the numerical contents, which is not only limited to the error correction of the format of the numerical values, but also the logical error correction of the numerical contents, so as to improve the numerical error correction capability and thereby improving the recall rate of detection and correction of wrong values. In the description of the present disclosure, the terms "first" and "second" are only used to describe purposes, and cannot be understood as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, and the like, unless otherwise specified.

It is to be understood that the various forms of processes illustrated above can be used to reorder, add or delete blocks. For example, the blocks described in the present disclosure can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of this disclosure.

What is claimed is:

1. A method for error correction of numerical contents in a text, comprising:
    obtaining, by a computer processor, a target text to be processed;
    determining, by the computer processor, original numerical contents included in the target text;
    determining, by the computer processor, target types corresponding to the original numerical contents; and
    performing, by the computer processor, error correction on each original numerical content according to an error correction manner corresponding to each target type;
    wherein the target text comprises a counting type value, an initial counting point, and an ending counting point, wherein performing error correction on each original numerical content according to an error correction manner corresponding to each target type comprises:
    determining, by the computer processor, the initial counting point and the ending counting point corresponding to the counting type value;
    determining, by the computer processor, a target count value according to the ending counting point and the initial counting point;
    replacing, by the computer processor, the counting type value by the target count value in case that the target count value does not match the counting type value;
    wherein the target text comprises N original numerical contents, wherein N is an integer greater than 1; and
    performing normalization on M original numerical contents according to data formats associated with the target types corresponding to the M original numerical contents in case that the target types corresponding to the M original numerical contents are the same, wherein M is a positive integer less than or equal to N.

2. The method of claim 1, wherein determining the original numerical contents included in the target text comprises at least one of:
    traversing the target text based on a specified keyword to determine the original numerical contents included in the target text that match the specified keyword; and,
    traversing the target text based on a specified template to determine the original numerical contents included in the target text that match the specified template.

3. The method of claim 1, wherein the target text comprises at least two consecutive amount type values, wherein performing the error correction on each original numerical content according to an error correction manner corresponding to each target type comprises:
    performing normalization on the at least two consecutive amount type values to obtain at least two amount type values in a same format;
    determining target values corresponding to remaining amount type values except for a first amount type value in the at least two consecutive amount type values according to the first amount type value in case that the at least two amount type values in the same format are inconsistent; and
    replacing the remaining amount type values by the target values.

4. The method of claim 1, wherein performing the error correction on each original numerical content comprises:
    determining a second display mode corresponding to numerical contents subjected to the error correction according to a first display mode corresponding to the original numerical contents in the target text; and
    adding the numerical contents subjected to the error correction to a position where the original numerical contents are located based on the second display mode.

5. An apparatus for error correction of numerical contents in a text, comprising:
    one or more processors;

a memory storing instructions executable by the one or more processors;
wherein the one or more processors are configured to:
obtain a target text to be processed;
determine original numerical contents included in the target text;
determine target types corresponding to the original numerical contents; and
perform error correction on each original numerical content according to an error correction manner corresponding to each target type;
wherein the target text comprises a counting type value, an initial counting point, and an ending counting point;
wherein the one or more processors are configured to:
determine the initial counting point and the ending counting point corresponding to the counting type value;
determine a target count value according to the ending counting point and the initial counting point;
replace the counting type value by the target count value in case that the target count value does not match the counting type value;
wherein the target text comprises N original numerical contents, wherein N is an integer greater than 1; and
perform normalization on M original numerical contents according to data formats associated with the target types corresponding to the M original numerical contents in case that the target types corresponding to the M original numerical contents are the same, wherein M is a positive integer less than or equal to N.

6. The apparatus of claim 5, wherein the one or more processors are configured to:
traverse the target text based on a specified keyword to determine the original numerical contents included in the target text; and
traverse the target text based on a specified template to determine the original numerical contents included in the target text that match the specified template.

7. The apparatus of claim 5, wherein the one or more processors are configured to:
perform normalization on at least two consecutive amount type values to obtain at least two amount type values in a same format;
determine target values corresponding to remaining amount type values except for a first amount type value in the at least two consecutive amount type values according to the first amount type value in case that the at least two amount type values in the same format are inconsistent; and
replace the remaining amount type values by the target values.

8. The apparatus of claim 5, wherein the one or more processors are configured to:
determine a second display mode corresponding to numerical contents subjected to the error correction according to a first display mode corresponding to the original numerical contents in the target text; and
add the numerical contents subjected to the error correction to a position where the original numerical contents are located based on the second display mode.

9. A non-transitory computer-readable storage medium having computer instructions stored thereon, wherein the computer instructions are configured to cause a computer to execute a method for error correction of numerical contents in a text, and the method comprises:
obtaining a target text to be processed;
determining original numerical contents included in the target text;
determining target types corresponding to the original numerical contents; and
performing error correction on each original numerical content according to an error correction manner corresponding to each target type;
wherein the target text comprises a counting type value, an initial counting point, and an ending counting point, wherein performing error correction on each original numerical content according to an error correction manner corresponding to each target type comprises:
determining the initial counting point and the ending counting point corresponding to the counting type value;
determining a target count value according to the ending counting point and the initial counting point;
replacing the counting type value by the target count value in case that the target count value does not match the counting type value;
wherein the target text comprises N original numerical contents, wherein N is an integer greater than 1; and
performing normalization on M original numerical contents according to data formats associated with the target types corresponding to the M original numerical contents in case that the target types corresponding to the M original numerical contents are the same, wherein M is a positive integer less than or equal to N.

10. The non-transitory computer-readable storage medium of claim 9, wherein determining the original numerical contents included in the target text comprises at least one of:
traversing the target text based on a specified keyword to determine the original numerical contents included in the target text that match the specified keyword; and,
traversing the target text based on a specified template to determine the original numerical contents included in the target text that match the specified template.

11. The non-transitory computer-readable storage medium of claim 9, wherein the target text comprises at least two consecutive amount type values, wherein performing the error correction on each original numerical content according to an error correction manner corresponding to each target type comprises:
performing normalization on the at least two consecutive amount type values to obtain at least two amount type values in a same format;
determining target values corresponding to remaining amount type values except for a first amount type value in the at least two consecutive amount type values according to the first amount type value in case that the at least two amount type values in the same format are inconsistent; and
replacing the remaining amount type values by the target values.

12. The non-transitory computer-readable storage medium of claim 9, wherein performing the error correction on each original numerical content comprises:
determining a second display mode corresponding to numerical contents subjected to the error correction according to a first display mode corresponding to the original numerical contents in the target text; and
adding the numerical contents subjected to the error correction to a position where the original numerical contents are located based on the second display mode.

* * * * *